US009516514B2

(12) United States Patent
Cho et al.

(10) Patent No.: US 9,516,514 B2
(45) Date of Patent: Dec. 6, 2016

(54) METHOD FOR MEASURING POSITION USING A POSITIONING ACCESS POINT, AND DEVICE, SYSTEM, AND ACCESS POINT FOR SAME

(75) Inventors: Chae Hwan Cho, Gwacheon Si (KR); Chang Seok Lee, Seoul (KR); Suk Yon Kang, Seoul (KR); Hye Min Lee, Seongnam-si (KR); Seung Yoon Baek, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 384 days.

(21) Appl. No.: 13/808,337

(22) PCT Filed: Jun. 28, 2011

(86) PCT No.: PCT/KR2011/004710
§ 371 (c)(1),
(2), (4) Date: Mar. 18, 2013

(87) PCT Pub. No.: WO2012/005468
PCT Pub. Date: Jan. 12, 2012

(65) Prior Publication Data
US 2013/0165150 A1    Jun. 27, 2013

(30) Foreign Application Priority Data

Jul. 5, 2010   (KR) .................. 10-2010-0064454

(51) Int. Cl.
| | |
|---|---|
| *H04W 24/00* | (2009.01) |
| *G01S 5/00* | (2006.01) |
| *H04W 64/00* | (2009.01) |
| *H04L 29/08* | (2006.01) |

(Continued)

(52) U.S. Cl.
CPC ............ *H04W 24/00* (2013.01); *G01S 5/0009* (2013.01); *H04L 67/18* (2013.01); *H04W 64/00* (2013.01); *H04W 60/04* (2013.01); *H04W 84/12* (2013.01)

(58) Field of Classification Search
CPC ....... G01S 5/0009; G01S 19/48; H04W 64/00; H04W 60/04; H04W 84/12; H04W 24/00; H04L 67/18
See application file for complete search history.

(56) References Cited

U.S. PATENT DOCUMENTS

| | | | |
|---|---|---|---|
| 7,676,218 B2 * | 3/2010 | Ballai | H04L 63/10 380/250 |
| 2005/0037775 A1 * | 2/2005 | Moeglein | G01S 5/0036 455/456.1 |

(Continued)

FOREIGN PATENT DOCUMENTS

| | | |
|---|---|---|
| JP | 2008219394 A | 9/2008 |
| KR | 10-2009-0022829 | 3/2009 |

(Continued)

OTHER PUBLICATIONS

International Search Report mailed Feb. 24, 2012 for PCT/KR2011/004710, citing the above references.

*Primary Examiner* — Kevin Bates
*Assistant Examiner* — Dae Kim
(74) *Attorney, Agent, or Firm* — Hauptman Ham, LLP

(57) ABSTRACT

The present disclosure provides in some aspects a method for positioning by a positioning access point, and an apparatus, system and access point for the same. A positioning system includes an AP including a positioning AP for delivering a positioning WLAN signal containing a dedicated positioning information and a telecom AP for delivering a telecom WLAN signal; database for storing an identification information of the access point and a location information belonging to the AP and matching the identification information; terminal for communicating with the (Continued)

AP; and WLAN-based positioning server responsive to a positioning request from the terminal for comparing a parameter of a WLAN signal received from the terminal with an identification information of the positioning AP on a priority basis, and when there is a match of information, granting the location information of the relevant access point the highest priority to determine the location of the terminal.

18 Claims, 8 Drawing Sheets

(51) Int. Cl.
   *H04W 60/04* (2009.01)
   *H04W 84/12* (2009.01)

(56) References Cited

U.S. PATENT DOCUMENTS

| | | | | |
|---|---|---|---|---|
| 2006/0154678 A1* | 7/2006 | Maeda | ............ | H04B 7/0814 455/500 |
| 2007/0202888 A1* | 8/2007 | Brachet | ............ | G01S 5/02 455/456.1 |
| 2008/0076398 A1* | 3/2008 | Mate | ............ | C03C 17/09 455/414.2 |
| 2008/0320108 A1* | 12/2008 | Murty | ............ | H04W 48/20 709/220 |
| 2010/0039929 A1* | 2/2010 | Cho et al. | ............ | 370/216 |
| 2010/0287052 A1* | 11/2010 | Minter | ............ | G06Q 30/02 705/14.64 |
| 2010/0291949 A1* | 11/2010 | Shapira | ............ | G01S 19/48 455/456.1 |
| 2011/0201358 A1* | 8/2011 | Karaoguz | ............ | H04W 4/02 455/456.3 |

FOREIGN PATENT DOCUMENTS

| | | |
|---|---|---|
| KR | 10-2009-0095773 | 9/2009 |
| KR | 10-2010-0001381 | 1/2010 |
| KR | 10-2010-0030349 | 3/2010 |

\* cited by examiner

| MAC Address | SSID | Channel | Latitude | Altitude | Address | Bldg. Floor |
|---|---|---|---|---|---|---|
| 00:11:33:11:3e:11 | S*bucks Gangnam | | | | | |
| 00:11:33:11:3e:33 | S*T AP | | | | | |
| 00:11:33:11:3e:44 | N*spot | | | | | |
| 00:11:33:11:3e:44 | N*spot | | | | | |
| ⋮ | ⋮ | | | | | |

*FIG. 6*

METHOD FOR MEASURING POSITION USING A POSITIONING ACCESS POINT, AND DEVICE, SYSTEM, AND ACCESS POINT FOR SAME

TECHNICAL FIELD

The present disclosure relates in some aspects to a method for positioning by a positioning access point, and an apparatus, system and access point for the same. Wireless LAN or WLAN-based positioning system is to perform positioning based on the MAC address of an operator or private access point, and the system through an establishment of WLAN network is used for data communications and positioning at the same time, which is influenced by radio environment dependent on a traffic volume. More particularly in this circumstance, the present disclosure relates to a method for positioning by a positioning access point, and an apparatus, system and access point for the same wherein a WLAN network is constructed with a separate positioning access point installed to provide a high precision positioning within a service operator's coverage premises stably uninfluenced by the traffic-dependent radio environmental changes and dedicated lines.

BACKGROUND

The statements in this section merely provide background information related to the present disclosure and may not constitute prior art.

With the rapid development of computer, electronic and communication technologies, there have been provided a variety of wireless communication services using wireless networks. Accordingly, mobile communication systems' offering of services using wireless communication networks have evolved from voice services to multimedia communication services that transmit circuit data, packet data, and the like.

Among a variety of wireless Internet services using mobile communication terminals, a location based service (LBS) has attracted much attention due to the wide applications and convenience thereof. An LBS refers to a communication service that determines a location of a mobile communication terminal, such as a portable phone and a personal digital assistant (PDA), and provides additional information related to the determined location. Location determination or positioning technologies for providing an LBS may be classified into a network based scheme, a handset based scheme, and a hybrid scheme. Specifically, the network based scheme checks a location by software using radio environments, which are a cell radius of a base station in a mobile communication network, in order to determine the location of a mobile communication terminal. The handset based scheme uses a GPS receiver mounted on a mobile communication terminal in order to determine the location of the mobile communication terminal. The hybrid scheme is a combination of the network based scheme and the handset based scheme.

Meanwhile, in the current trend of LBS, there is a growing need for more accurate positioning technologies.

DISCLOSURE

Technical Problem

Therefore, in order to solve the above-described problems, one or more embodiments of the present disclosure are directed to provide a method for positioning by a positioning access point, and an apparatus, system and access point for the same wherein a WLAN network is constructed with separate positioning access points installed to provide a high precision positioning within a service operator's setting of coverage premises stably uninfluenced by the traffic-dependent radio environmental changes and dedicated lines.

SUMMARY

An embodiment of the present disclosure provides a positioning system including an access point including a positioning access point for delivering a positioning signal containing a positioning information and a telecom access point for delivering a telecom WLAN signal; a database for storing an identification information of the access point and a location information belonging to the access point and matching the identification information; a terminal for communicating with the access point; and a WLAN-based positioning server responsive to a positioning request from the terminal for comparing a parameter of a WLAN signal received from the terminal with an identification information of the positioning access point on a priority basis, and when there is a match of information, granting the location information of the relevant access point the highest priority to determine the location of the terminal.

Another embodiment of the present disclosure provides a positioning apparatus including a database for storing an identification information of each access point of a telecom access point and a positioning access point and a location information belonging to said each access point and matching the identification information; an information receiver responsive to a positioning request from a terminal in communication with one or more access points of the telecom access point and the positioning access point, for receiving a terminal WLAN signal from the terminal; a record determination unit for discriminating on a priority basis whether an access point identification information within the parameter of a received terminal WLAN signal is equal to the identification information prestored for the positioning access point in the database; and a positioning determination unit for granting priority depending on discriminated equality or inequality to the identification information of the positioning access point and determining the location of the terminal by using a location information matching the access point identification information based on a granted priority result.

Yet another embodiment of the present disclosure provides an access point including an antenna for transmitting outward or receiving inward radio waves along a particular direction; a positioning information storage unit for storing a positioning information; a positioning information delivery unit for controlling to deliver a positioning WLAN signal containing the positioning information in a predetermined direction via the antenna; and a power supply unit for supplying electric power.

Yet another embodiment of the present disclosure provides a positioning method including: in response to a positioning request from a terminal in communication with one or more access points of the telecom access point and a positioning access point, receiving a terminal WLAN signal from the terminal; discriminating on a priority basis whether an access point identification information within a parameter of a received terminal WLAN signal is equal to an identification information prestored for the positioning access point in a database; and granting priority depending on discriminated equality or inequality to the identification information of the positioning access point and determining the location of the terminal by using a location information matching the access point identification information based on a granted priority result.

Advantageous Effects

According to one of the embodiments of the present disclosure as described above, a WLAN network is constructed with separate positioning access points installed to provide a high precision positioning within a service operator's setting of coverage premises stably uninfluenced by the traffic-dependent radio environmental changes and lines. In addition, according to an embodiment, positioning access points are free of installation of an Ethernet cable and able to save the investment for the installation forward the WLAN-based positioning accuracy. Further, in an embodiment, a power supply just to the positioning access points maintains the WLAN network, whereby maintenance cost reduction is achieved with the WLAN network for the positioning operation.

DESCRIPTION OF DRAWINGS

FIG. 6 is an exemplary diagram of a positioning access point DB according to one embodiment of the present disclosure;

DETAILED DESCRIPTION

Figure 1:
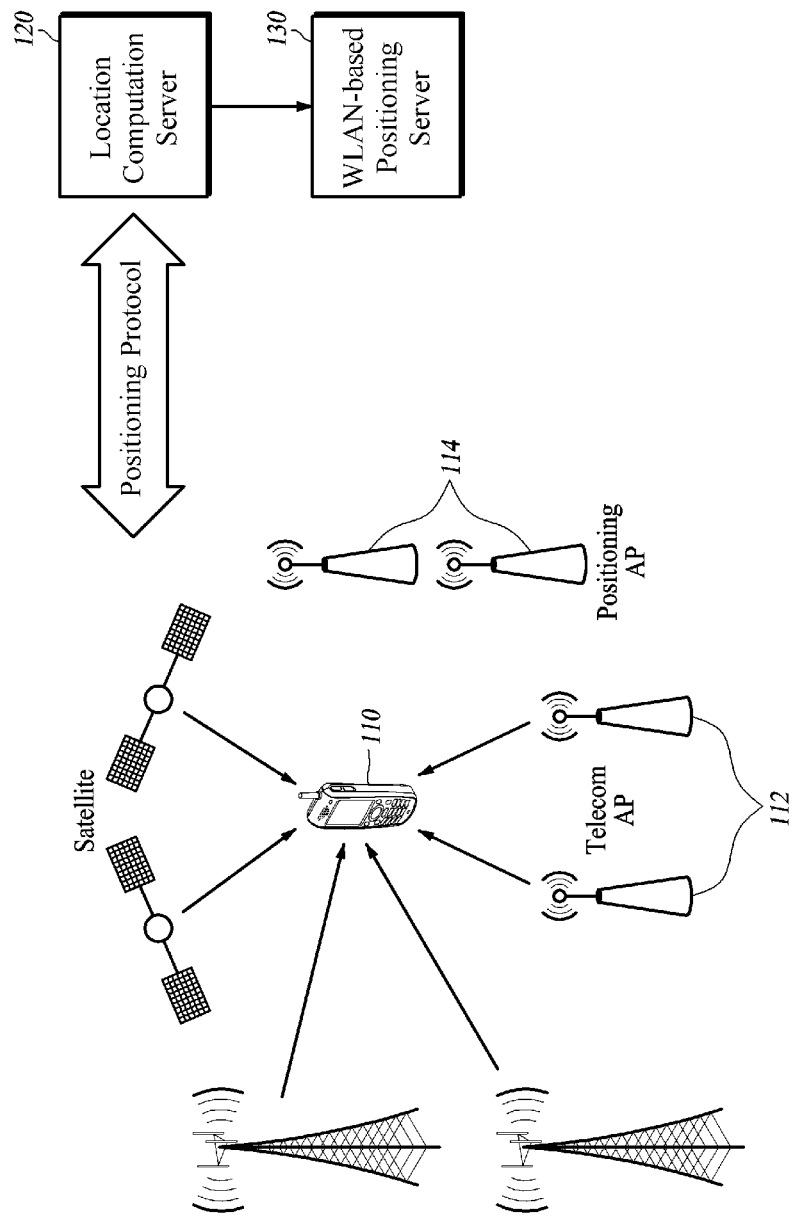
FIG. 1 is a block diagram schematically showing a system for positioning by a positioning access point according to one embodiment of the present disclosure.

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a block diagram schematically showing a system for positioning by a positioning access point according to one embodiment of the present disclosure.

The system for positioning with the use of the positioning access point (AP) includes a mobile terminal 110, a telecom access point or AP 112, a positioning access point 114, a location computation server 120 and a WLAN-based positioning server 130. Meanwhile, the positioning system with the positioning access point in the embodiment is described as including in particular the mobile terminal 110, telecom AP 112, positioning access point 114, location computation server 120 and WLAN-based positioning server 130 to merely exemplify the technical idea embodied by the present disclosure, but a skilled person in the technical area of the present disclosure could change and modify the components of the positioning system with the positioning access point towards diverse applications without departing from the intrinsic characteristics of the embodiment. The telecom WLAN signal and the positioning WLAN signal described in the present disclosure include one or more of Wi-Fi signal, WiMax signal, DTIM (delivery traffic indication message) and hot spot signal. Here, DTIM is a kind of TIM for advising the possible presence in an access point of data to be sent to the relevant wireless client.

Mobile terminal 110 is adapted to perform the typical voice call and data communication, and utilizes a provided wireless communication module to interwork with a mobile communication network (not shown) and perform the typical voice call and data communication wirelessly.

In addition, mobile terminal 110 is equipped with a WLAN module which allows connecting with the Internet through identified access points around to receive various web page data. Here, the access point or AP is a device which makes connections for data communication and is capable of reading receiver address from the sender information, designating the most appropriate communication path, and making a transmission to another network. That is, the AP may extract the position of a data packet, designate the optimal communication route for the extracted position, deliver the data packet along the designated communication route to next device, and share a plurality of lines in general network environment. In this embodiment, the AP may encompass a router, repeater, relay and bridge. It is classified by the present disclosure into telecom AP 112 and positioning AP 114 both of which will be described in detail below.

In addition, mobile terminal 110 is a terminal mounted with a GPS module. Mobile terminal 110 extracts navigation data from GPS (global positioning system) radio signals received from one or more GPS satellites, and transmits the extracted navigation data to position calculation server 120 through the mobile communication network. Mobile terminal 110 according to one embodiment of the present disclosure may be mounted with the GPS module, but is not necessarily limited thereto.

Mobile terminal 110 may be any one of a smart phone, a personal computer (PC), a notebook computer, and a personal digital assistant (PDA), each of which is mounted with a wireless communication module, a GPS module and a WLAN module. Mobile terminal 110 refers to a terminal that includes a memory for storing application software for use in location-based services (LBS), a microprocessor for executing a program to do computing and controlling, and the like. Mobile terminal 110 recognizes telecom AP 112 and positioning AP 114 in the periphery areas and performs communications with one or more of telecom AP 112 and positioning AP 114.

Positioning protocol refers to a protocol that is standardizing requirements of the application layer for positioning operation. Any positioning protocols may be used as long as they send and receive GPS signals and WLAN signals between mobile terminal 110 and location computation server 120. The positioning protocol may also include SUPL (Secure User Plane Location) 2.0 to send and receive both the GPS signals and WLAN signals between mobile terminal 110 and location computation server 120, but is not necessarily limited thereto. The SUPL herein is a method for obviating the need for the existing positioning procedures to render respective network nodes to communicate by allowing a direct exchange of positioning related data between location computation server 120 and mobile terminal 110. The SUPL is a protocol which reduces cost for implementing the nodes needed for positioning operation and provides more accurate positioning service. With SUPL 2.0 used by mobile terminal 110, an RTD (round trip delay) may be measured. Specifically, when communicating with a WLAN signal, mobile terminal 110 may set a single location ID or multiple location IDs and measure RTD including WLAN AP info of RTD value, RTD units and RTD accuracy.

Telecom AP 112 is a device capable of sending and receiving data packets between the terminal and server, and may be adapted to extract the position of a data packet, designate the optimal communication route for the extracted position, deliver the data packet along the designated communication route to next device, and share a plurality of lines in general network environment. This embodiment defines the transmittal signals for transporting the data packets from and to telecom AP 112 as telecom WLAN signal.

Positioning AP 114 means a dummy access point designed for positioning other than data packet transporting. In other words, positioning AP 114 is a device for delivering positioning information through a beacon signal just with a power supply but needing no Ethernet cable. Meanwhile, implementing the positioning AP 114 without the Ethernet cable obviates the concern for sustaining an Ethernet network, and therefore, the device can become simpler to implement. In addition, positioning AP 114 may be energized with the power supply by the solar power or secondary battery, but is not necessarily limited thereto. Further, positioning AP 114 may use a directional antenna for delivering the positioning info in order to have the signal delivered to a particular area. For example, with positioning AP 114 installed in a particular building at a corner, the directional antenna may be used to radiate the positioning info into that building exclusively away from the building exterior, and thereby enhance the positioning accuracy. In the meantime, the WLAN signal transmitted by positioning AP 114 is defined by the present disclosure as positioning WLAN signal including the positioning info.

In the following, more detailed description regarding positioning AP 114 will be provided. Positioning AP 114 may be installed with an antenna 210 that is directional for transmitting outward or receiving inward radio waves along a particular direction, store positioning info, radiate the positioning WLAN signal including the positioning info through the installed antenna 210 to a preset direction, include a power supply 230, and follow a control order to adjust its coverage. Herein, power supply 230 in positioning AP 114 may be a secondary battery including a lead storage battery, alkaline battery, gas cell, lithium-ion battery, nickel-hydride battery, nickel-cadmium cell, polymer battery and lithium polymer battery, but is not necessarily limited thereto. Positioning AP 114 may also be irradiated with solar heat and convert the irradiation into electric energy for use as the power source.

Although the present disclosure depicts location computation server 120 to be separate from WLAN-based positioning server 130 to merely exemplify the technical idea of the present disclosure, a skilled person in the technical area of the present disclosure could combine the two without departing from the intrinsic characteristics of the embodiment.

Location computation server 120 receives satellite data via satellite receiving unit, and performs positioning with satellite data of mobile terminal 110. Specifically, location computation server 120 receives navigation data from mobile terminal 110 to perform the function of computing the latitude and longitude coordinates of mobile terminal 110. In addition, location computation server 120 transmits aiding data to assist with positioning of mobile terminal 110 and performs the function of calculating the distance between the GPS satellite and mobile terminal 110. In addition, upon receiving location info from mobile terminal 110 selectively as needed, location computation server 120 performs a function of transmitting the location info to a location based service platform (LBSP). Location computation server 120 may deliver the latitude/longitude data resulting from the positioning and pilot phase measurement (hereinafter abbreviated to "PPM") data to the server for network based positioning. Location computation server 120 receives a signal of location request from the LBSP, and provides HLR (Home location register) with a SMREQ (Short Message Request) signal for requesting information of the target terminal to be located. Location computation server 120 receives from the relevant HLR the SMREQ signal containing the response to the information request for the target terminal to be located. Location computation server 120, interworking with mobile terminal 110, may perform the positioning on mobile terminal 110 and then transmit the signal of location result including the determined location from the positioning to the LBSP.

Meanwhile, for location computation server 120, CDMA (code division multiple access) system may use a PDE (position determination entity, hereinafter called "PDE"), asynchronous W-CDMA (wideband CDMA) system may use a PS (position server), and European time division mobile communication system of GSM (global system for mobile communication) may use a SMLC (serving mobile location center), but is not necessarily limited thereto. In CDMA, the PDE may perform a network method of positioning function using the satellite-assisted positioning and triangulation measurement functions. Further, the PS in W-CDMA may perform the satellite-assisted positioning and a basic cell method of positioning function, and the SMLC in GSM may perform the satellite-assisted positioning and a cell method of positioning function.

Meanwhile, the aforementioned PPM data includes measurements by mobile terminal 110 of system information and neighboring base station time/distance information. Here, basic data collected by mobile terminal 110 includes information of the currently serviced system, pilot signals of neighboring base stations, signal strength (Ec/Io), etc. The information of the currently serviced system includes a SID (system ID), NID (network ID), BSID (base station ID) and currently serviced base station sector number (Reference PN, hereinafter called "Ref_PN"), pilot phase within the Ref_PN, signal strength, etc. In addition, the pilot signals of the neighboring base stations include distance data and time data such as neighboring base station sector numbers (measurement PN) collected by mobile terminal 110, the pilot phase in each of the neighboring base station sector numbers and signal strength. The aforementioned PPM data in the CDMA system is related to positioning, and in W-CDMA it may be an SFN-SFN (system frame number) observed time difference or UE RX-TX time difference, and is unlimited thereto but may be positioning-related data that is used in overall communication systems.

Meanwhile, the above description suggests that location computation server 120 is applicable to CDMA and WCDMA and provides the network based positioning in a way to merely exemplify the technical idea embodied by the present disclosure, but a skilled person in the technical area of the present disclosure could modify location computation server 120 to be applicable to WiBro or WiMax, LTE (long term evolution) and EPC (evolved packet core) and provide the network based positioning without departing from the intrinsic characteristics of the embodiment.

In response to a positioning request from mobile terminal 110, WLAN-based positioning server 130 according to an embodiment compares parameter of the terminal WLAN signal received from mobile terminal 110 with the identification information of positioning AP 114 on a priority basis to find a possible match of information and then grant the highest priority to the location information of the relevant AP, thereby determining the location of mobile terminal 110.

In the following, more detailed description will be provided for WLAN-based positioning server 130 to position mobile terminal 110. In response to a positioning request from mobile terminal 110 that communicates with at least one of telecom AP 112 and positioning AP 114, WLAN-based positioning server 130 receives a terminal WLAN signal from mobile terminal 110. WLAN-based positioning server 130 makes a determination on a priority basis of whether AP identification information within the parameter of the terminal WLAN signal received from mobile terminal 110 is equal to ID info prestored for positioning AP 114 in database 340. WLAN-based positioning server 130 grants priority depending on whether the AP ID info is discriminated to be equal or unequal to the ID info of positioning AP 114, and determines the location of mobile terminal 110 by using location info matching the AP ID info based on the granted priority result. Depending on discriminated equality or inequality to the ID info of positioning AP 114, WLAN-based positioning server 130 grants the AP ID info the highest priority, based on which the location of mobile terminal 110 is determined with the location info matching the AP ID info. Meanwhile, if there is no information identical to the ID info of positioning AP 114, WLAN-based positioning server 130 takes the best alternative to discriminate whether the AP ID info is equal or inequal to the ID info of telecom AP 112, and grants priority depending on equality/inequality to telecom AP 112, and determines the location of mobile terminal 110 by using location info matching the AP ID info based on the granted priority result.

To know whether the positioning AP is malfunctioning or off, WLAN-based positioning server 130 receives the positioning WLAN signal of positioning AP 114 through telecom AP 112 together with the telecom WLAN signal, and if no positioning WLAN signal is received, it recognizes positioning AP 114 at the relevant location to be malfunctioning or off. For example, when installing telecom AP 112 with its modem setting changed to receive the positioning WLAN signal of positioning AP 114 and transmit the same to WLAN-based positioning server 130, server 130 may receive the WLAN signal of positioning AP 114 through telecom AP 112. In other words, as channel setting of telecom AP 112 is carried out by scanning the entire frequencies (total of 13 frequencies) and discriminating a single unused frequency band, setting into a common frequency band between telecom AP 112 and positioning AP 114 would allow receiving the positioning WLAN signal of positioning AP 114 as well as transmitting the telecom WLAN signal at telecom AP 112. At the same time, the positioning WLAN signal includes positioning information, which in turn contains one or more of the MAC address of the AP that is BSSID (Basic Service Set IDentifier), SSID (Service Set IDentifier), AP channel info, latitude/longitude/altitude data of the AP.

Meanwhile, in response to the terminal WLAN signal received from mobile terminal 110 and containing one or more of the latitude/longitude/altitude data of the AP, WLAN-based positioning server 130 compares the same one or more data with the location info prestored for positioning AP 114 in database 340 to determine the position of mobile terminal 110. Based on the bits preassigned to the MAC address in the parameter of the terminal WLAN signal received from mobile terminal 110, WLAN-based positioning server 130 discriminates the manufacturer information of the relevant AP, and if the manufacturer information matches the prestored manufacturer of the positioning AP, it recognizes the MAC address among the parameters of the terminal WLAN signal being correspond to positioning AP 114. In other words, the MAC address refers to the unique information of BSSID capable of identifying the relevant AP. There may be total of 48 bits of such MAC address assigned, and 24 bits of them are inputs assigned by the manufacturer.

In addition, WLAN-based positioning server 130 includes database 340 for storing the ID info of telecom AP 112 and positioning AP 114 and the location info of the AP matching the ID info. More specifically, database 340 includes a telecom AP DB and a positioning AP DB. The telecom AP DB is for storing a first ID info on telecom AP 112 and a first location info which is location info of telecom AP 112 matching the first ID info. The positioning AP DB is for storing a second ID info on positioning AP 114 and a second location info which is location info of positioning AP 114 matching the second ID info. Then, such database 340 may be implemented inside or outside of WLAN-based positioning server 130.

Figure 2:
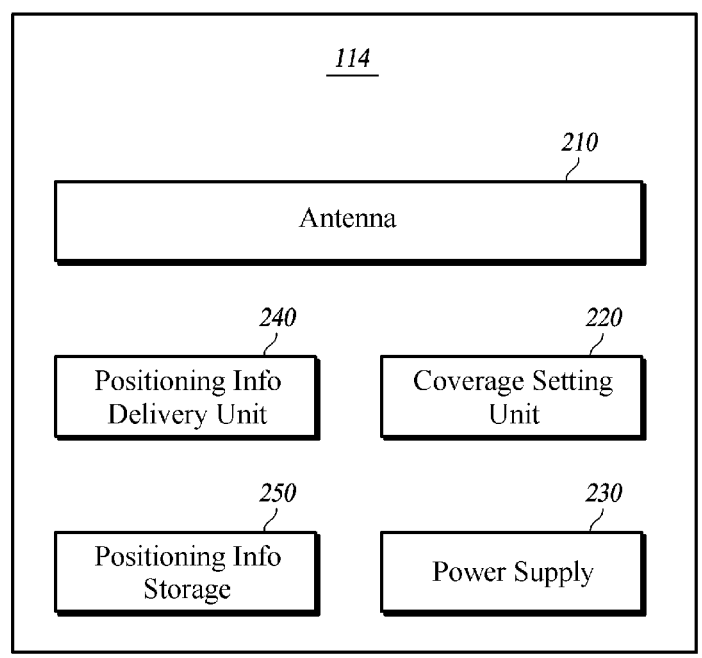
FIG. 2 is a block diagram schematically showing a positioning access point according to one embodiment of the present disclosure.

FIG. 2 is a block diagram schematically showing positioning AP 114 according to one embodiment of the present disclosure.

Positioning AP 114 according to one embodiment includes an antenna 210, a coverage setting unit 220, a power supply 230, a positioning info delivery unit 240 and a positioning info storage 250. Although the antenna 210, coverage setting unit 220, power supply 230, positioning info delivery unit 240 and positioning info storage 250 are particularly mentioned to be included in positioning AP 114 to merely exemplify the technical idea embodied by the present disclosure, a skilled person in the technical area of the present disclosure could change and modify the components of positioning AP 114 with the positioning access point towards diverse applications without departing from the intrinsic characteristics of the embodiment.

Antenna 210 is adapted to deliver or receive radio waves in a particular direction. Antenna 210 may be a directional antenna, but is not necessarily limited thereto. For example, if it is omnidirectional, antenna 210 may be adjusted so that radio waves are delivered through a separate module mounted on positioning AP 114. Coverage setting unit 220 is configured to adjust the coverage of the positioning AP 114 based on an external input as it interworks with an external server. Specifically, the operator of positioning AP 114 may be allowed to adjust the AP coverage. For example, if a mobile network operator runs positioning AP 114, the operator may the coverage of positioning AP 114 through WLAN-based positioning server 130.

Power supply 230 is a module for supplying electric power into positioning AP 114. Power supply 230 may be a secondary battery including any one of a lead storage battery, alkaline battery, gas cell, lithium ion battery, nickel-hydride battery, nickel-cadmium cell, polymer battery and lithium-polymer battery, but is not necessarily limited thereto. In other words, power supply 230 in implementation may be designed to receive power from an external power supply. Positioning info delivery unit 240 controls to deliver a positioning WLAN signal containing positioning info in a predetermined direction via antenna 210. Positioning info storage 250 stores positioning info. Herein, the positioning info contains one or more of the MAC address of the AP that is BSSID, SSID, AP channel info, latitude/longitude/altitude data of the AP. In the meantime, positioning AP 114 may be provided with a solar panel energized with the solar heat, and use a provided power converter for converting the solar heat introduced through the solar panel power to electric energy for use as the power source.

Figure 3:
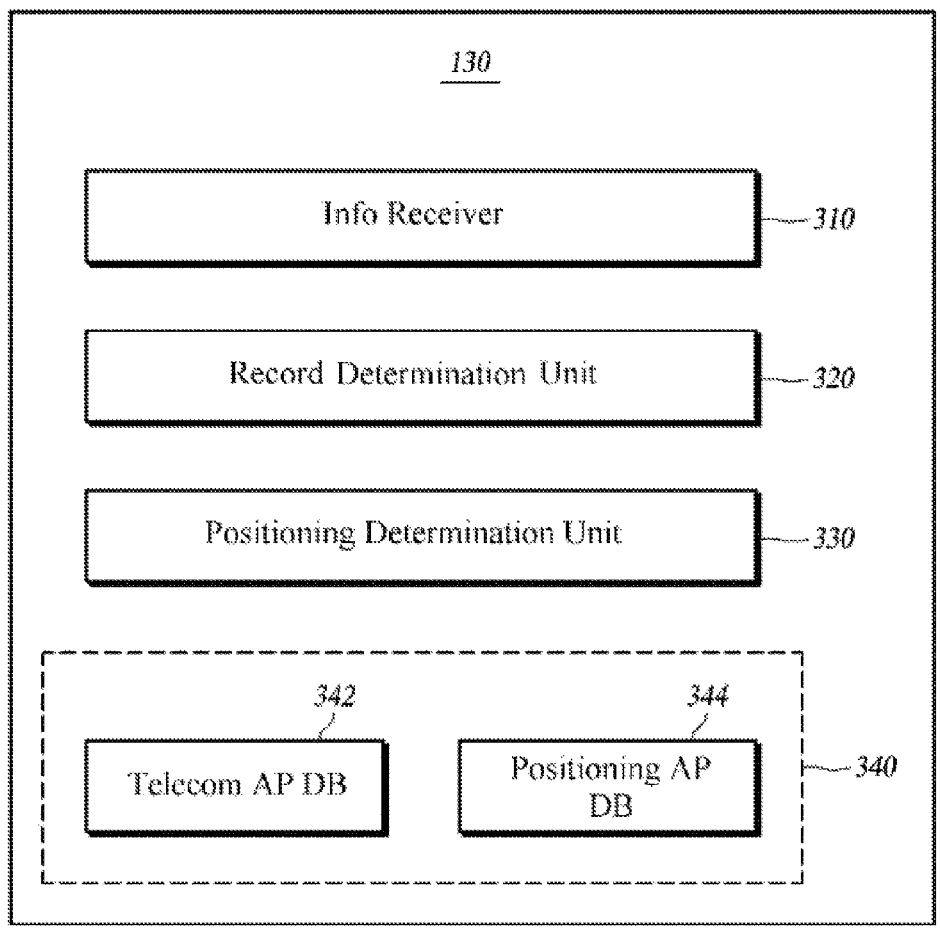
FIG. 3 is a block diagram schematically showing a WLAN-based positioning server according to one embodiment of the present disclosure.

FIG. 3 is a block diagram schematically showing a WLAN-based positioning server according to one embodiment of the present disclosure.

WLAN-based positioning server 130 in the embodiment includes an info receiver 310, a record determination unit 320, a positioning determination unit 330 and a database 340. Despite the specific mention of info receiver 310, record determination unit 320, positioning determination unit 330 and database 340, a skilled person in the technical area of the present disclosure could change and modify the components of WLAN-based positioning server 130 for diverse applications without departing from the intrinsic characteristics of the embodiment.

Upon receiving a positioning request from mobile terminal 110 in communication with at least one of telecom AP 112 and positioning AP 114, info receiver 310 also receives a terminal WLAN signal from mobile terminal 110. Among parameters in the terminal WLAN signal received, record determination unit 320 discern on a priority basis if AP ID info is either equal or unequal to the ID info prestored for positioning AP 114 in database 340. Additionally, in the absence of info equal to the ID info of positioning AP 114, record determination unit 320 takes the bits assigned to the MAC address among the parameters in the terminal WLAN signal as an identification of the relevant AP manufacturer to see if it positively identifies the discriminated unit as the prestored positioning AP manufacturer, and then recognizes the MAC address among the parameters in the terminal WLAN signal as corresponding to the positioning AP.

Positioning determination unit 330 grants priorities depending on a positive or negative identification to the ID info of positioning AP 114 and determines the location of mobile terminal 110 by using location info matching the AP ID info based on the outcome of the granted priorities. Positioning determination unit 330 is responsive to a detection of the positive identification to the ID info of positioning AP 114 for granting the AP ID info the highest priority, based on which the AP ID info finds matching location info for use in locating mobile terminal 110. Positioning determination unit 330 grants priorities depending on a positive or negative identification to the ID info of telecom AP 112 and determines the location of mobile terminal 110 by using location info matching the AP ID info based on the outcome of the granted priorities.

To know whether the positioning AP is malfunctioning or off, positioning determination unit 330 receives the positioning WLAN signal of positioning AP 114 through telecom AP 112 together with the telecom WLAN signal, and if no positioning WLAN signal is received, it recognizes positioning AP at the relevant location to be malfunctioning or off. The positioning WLAN signal includes positioning signal, which contains one or more of the MAC address of the AP that is BSSID, SSID, AP channel info, latitude/longitude/altitude data of the AP. Positioning determination unit 330 compares at least one of the latitude, longitude and altitude info contained in the terminal WLAN signal with the location info prestored for positioning AP 114 in database 340 to determine the location of mobile terminal 110.

Database 340 stores respective ID info of telecom AP 112 and positioning AP 114 and respective location info matching the ID info. Database 340 includes a telecom access AP DB 342 and a positioning AP DB 344. Telecom access AP DB 342 stores first ID info of the telecom AP 112 and telecom AP location info matching the first ID info, namely first location info. Positioning access AP DB 344 stores second ID info of positioning AP 114 and positioning AP location info matching the second ID info, namely second location info.

Figure 4:
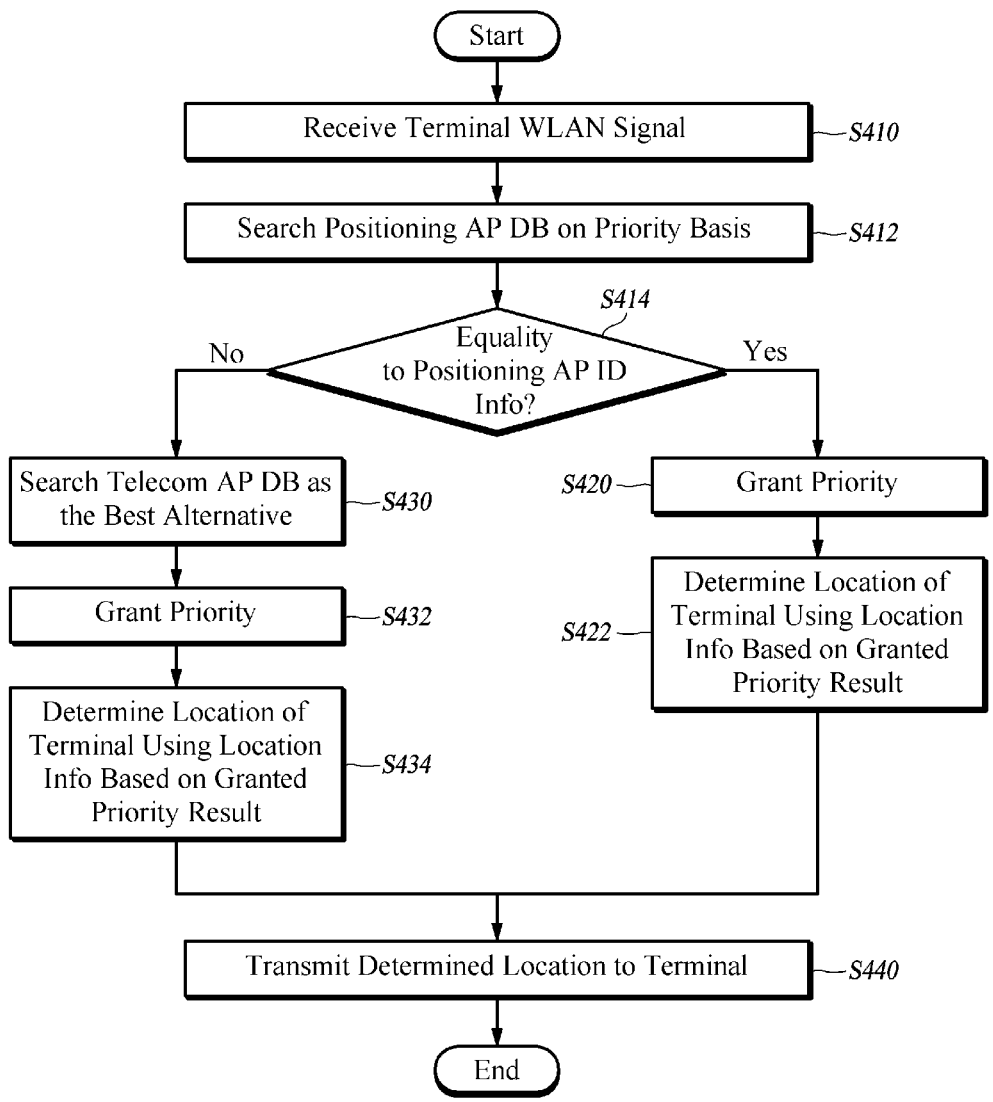
FIG. 4 is a flow chart showing a method for positioning by a positioning access point according to one embodiment of the present disclosure.

FIG. 4 is a flow chart showing a method for positioning by a positioning access point according to one embodiment of the present disclosure.

In response to a positioning request from mobile terminal 110 in communication with one or more of telecom AP 112 and positioning AP 114, WLAN-based positioning server 130 receives a terminal WLAN signal from mobile terminal 110 in step S410. Upon receiving the terminal WLAN signal from mobile terminal 110, positioning AP DB 344 of database 340 is searched on a priority basis through all the necessary functions (S412). WLAN-based positioning server 130 discerns whether AP ID info among parameters of the received terminal WLAN signal from mobile terminal 110 equals to ID info prestored for positioning AP 114 in database 340 (S414).

If step S414 confirms that the AP ID info equals to prestored positioning AP (114) ID info in database 340, WLAN-based positioning server 130 grants the AP ID info the highest priority (S420). Based on its earlier granting of the highest priority to the AP ID info, WLAN-based positioning server 130 uses location info matching the AP ID info to determine the location of mobile terminal 110 (S422). Meanwhile, in response to the terminal WLAN signal received from mobile terminal 110 and containing one or more of the latitude/longitude/altitude data of the AP, WLAN-based positioning server 130 may compare the same one or more data with the positioning AP (114) location info prestored in database 340 to determine the position of mobile terminal 110.

In addition, if step S414 finds that there is no equal information to the ID info of positioning AP 114, WLAN-based positioning server 130 makes next best choice of determining whether the AP ID info is determined to be equal or unequal to the ID info of telecom AP 112, and grants priority depending on equality/inequality to telecom AP 112 (S432). WLAN-based positioning server 130 determines the location of mobile terminal 110 by using location info matching the AP ID info based on the granted priority result (S434).

After steps S422 and S434, WLAN-based positioning server 130 sends the determined location info to mobile terminal 110 (S440).

Although FIG. 4 illustrates the sequential execution of steps S410 through S440, it is only to exemplify the technical idea of an embodiment and will be understood by skilled persons in the art pertaining to the embodiment that the steps may be carried out in a modified sequence or one or more selected steps from S410 to S440 may be concurrent or otherwise without restricting FIG. 4 to the serial order or departing from the essential characteristics of the present embodiment.

As described above, the method for positioning by a positioning access point according to one embodiment of the present disclosure may be implemented on a computer program and provided in a computer readable recording medium. The computer readable recording medium which encodes the computer program that implements the method for positioning by a positioning access point includes any kind of recording devices for recording data readable by computers. Examples of such computer readable recording medium are ROM, RAM, CD-ROM, magnetic tapes, floppy discs, and optical data storages, and further include an implementation in carrier waves (for example, transmission over the Internet). In addition, the computer readable recording medium may be provided in a distributed processing system where computer systems are networked to store and execute the computer readable codes at distributed locations. Furthermore, functional programs, codes, and code segments to implement the disclosed embodiments may be easily deduced by programmers skilled in the art thereof.

Figure 5:
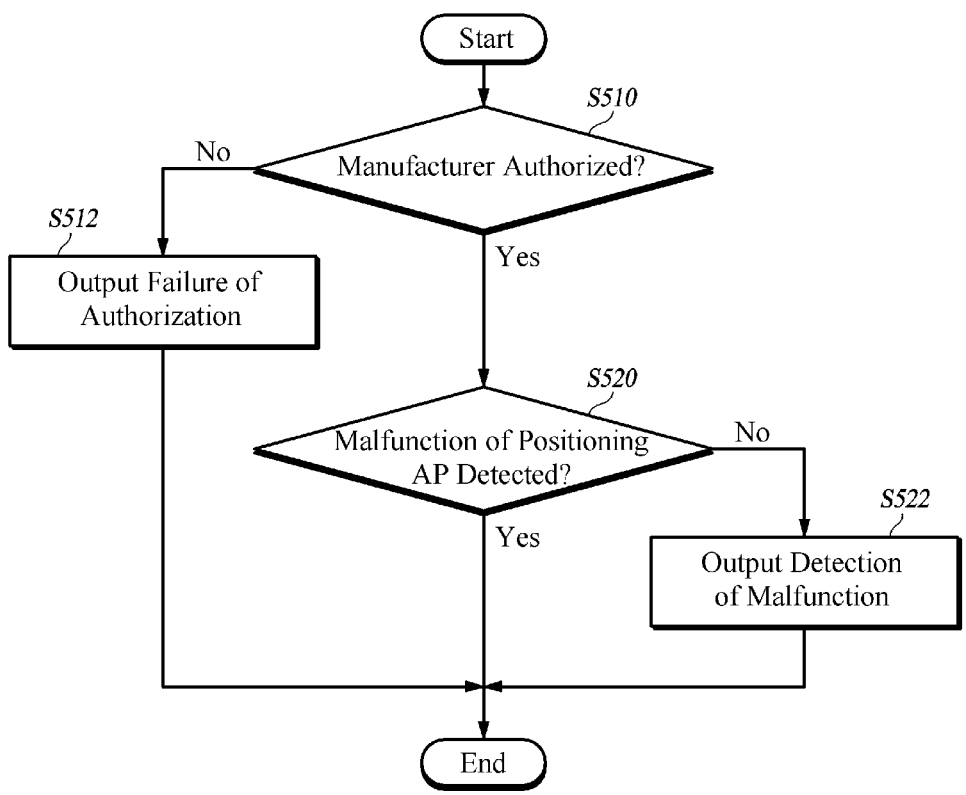
FIG. 5 is a flow chart showing a method for managing a positioning access point according to one embodiment of the present disclosure.

FIG. 5 is a flow chart showing a method for managing a positioning access point according to one embodiment of the present disclosure.

Upon receiving a terminal WLAN signal from mobile terminal 110, WLAN-based positioning server 130 searches positioning AP DB 344 on a priority basis, when server 130 can identify information of the relevant AP manufacturer, as is detailed by steps S510 through S522.

WLAN-based positioning server 130 determines whether AP ID info from the parameter of the received terminal WLAN signal from mobile terminal 110 is equal to ID info prestored for positioning AP 114 in database 340 (S414). In other words, while WLAN-based positioning server 130 can perform the WLAN-based positioning by first searching positioning AP DB 344 of database 340 to find the relevant AP and then make a high priority of positioning, the server 130 may also use the specific manufacturer info of positioning AP 114 and see if the AP ID info from the parameter of the received terminal WLAN signal from mobile terminal 110 is within a particular MAC address range where it determines the relevant AP in WLAN-based positioning server 130 is the positioning AP.

Based on the bits preassigned to the MAC address in the parameter of the terminal WLAN signal received from mobile terminal 110, WLAN-based positioning server 130 identifies the manufacturer information of the relevant AP, and sees if the manufacturer information matches the prestored manufacturer of the positioning AP (S510). That is, it can additionally confirm the manufacturer of positioning AP 114 through step S510. Herein, the MAC address refers to the unique information of BSSID capable of identifying the relevant AP. There may be total of 48 bits of such MAC address assigned, and 24 bits of them are inputs assigned by the manufacturer.

If step S510 finds that the identified manufacturer info is unequal to the prestored positioning AP manufacturer, WLAN-based positioning server 130 notifies the operator terminal of the fact of unauthorization (S512). In the meantime, if step S512 finds that the discerned manufacturer info coincides the prestored positioning AP manufacturer, WLAN-based positioning server 130 senses whether positioning AP 114 is malfunctioning or off (S520). Through telecom AP 112, a positioning WLAN signal from positioning AP 114 is received along with a telecom WLAN signal, and if no positioning WLAN signal is received, positioning AP 114 at the relevant location is recognized to be malfunctioning or off. For example, when installing telecom AP 112 with its modem setting changed to receive the positioning WLAN signal of positioning AP 114 and transmit the same to WLAN-based positioning server 130, server 130 may receive the WLAN signal of positioning AP 114 through telecom AP 112. In other words, as channel setting of telecom AP 112 is carried out by scanning the entire frequencies (total of 13 frequencies) and discriminating a single unused frequency band, setting into a common frequency band between telecom AP 112 and positioning AP 114 would allow receiving the positioning WLAN signal of positioning AP 114 as well as transmitting the telecom WLAN signal at telecom AP 112.

If step S520 confirms that positioning AP 114 is malfunctioning or off, WLAN-based positioning server 130 notifies this fact to the operator terminal (S522).

Although FIG. 5 illustrates the sequential execution of steps S510 through S522, it is only to exemplify the technical idea of an embodiment and will be understood by skilled persons in the art pertaining to the embodiment that the steps may be carried out in a modified sequence or one or more selected steps from S510 to S522 may be concurrent or otherwise without restricting FIG. 5 to the serial order or departing from the essential characteristics of the present embodiment.

The abovementioned method of FIG. 5 for managing a positioning access point according to one embodiment of the present disclosure may be also implemented as a program on a computer-readable recording medium. The computer-readable recording medium storing the program for realizing the method for managing the positioning access point by the embodiment may be any data storage device that can store data which can be thereafter read by a computer system. Examples of the computer-readable recording medium include ROMs, RAMs, CD-ROMs, magnetic tapes, floppy disks, optical data storage devices, and carrier waves (such as data transmission through the Internet). The computer-readable recording medium may also be distributed over network coupled computer systems so that computer-readable codes are stored and executed in a distributed fashion. In addition, functional programs, codes, and code segments for accomplishing one embodiment of the present disclosure may be easily construed by programmers skilled in the art to which the present disclosure pertains.

FIG. 6 is an exemplary diagram of a positioning access point DB according to one embodiment of the present disclosure.

Positioning AP DB 344 stores ID info of positioning AP 114 and location info that matches the ID info. Herein, the ID info may be MAC address, SID and AP channel info, and the location info may be information of latitude, longitude, altitude, address and building floor of the AP.

Herein, the MAC address refers to the unique information of BSSID capable of identifying the relevant AP. There may be total of 48 bits of such MAC address assigned, and 24 bits of them are inputs assigned by the manufacturer. SSID is also info for identifying the relevant AP and represents a user set value. For example, as illustrated in FIG. 5, it is information which may be set as 'S*bucks Gangnam', 'S*T AP', 'Ne*pot' or the like to identify the access point. The latitude, longitude and altitude refer to the coordinate value of the latitude, longitude and altitude of the relevant AP installment. The building floor info refers to the floor number where an AP is installed in a high rise building at the address info.

Such positioning AP DB 344 is intended to mean a common data structure that is implemented on a storage capacity (hard disk or memory) of computer system by using a database management program (DBMS), and implies a data storage format that can freely perform data search (retrieval), deletion, edition, addition and others. Positioning AP DB 344 may be implemented toward the purpose of one of the embodiments of the present disclosure by using a relational database management system such as Oracle, Informix, Sybase and DB2, or an object-oriented database management system including Gemston, Orion and O2, and an XML native database including Excelon, Tamino and Sekaiju, having appropriate fields or elements to achieve their functions.

Figure 7:
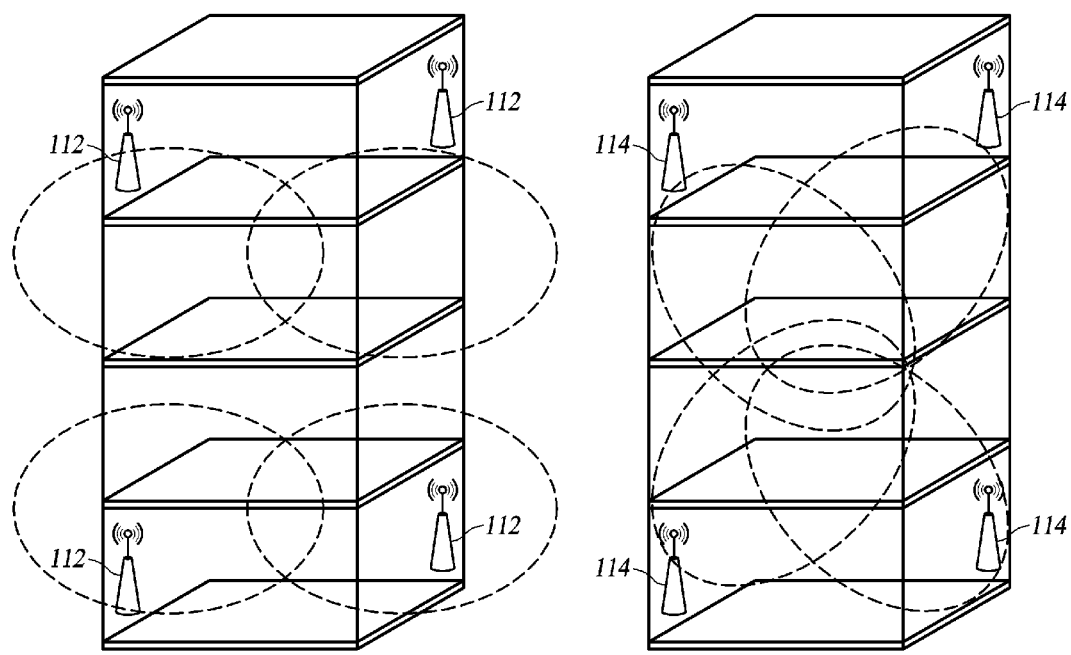
FIG. 7 is an exemplary diagram of a service by positioning access points according to one embodiment of the present disclosure.

FIG. 7 is an exemplary diagram of a service by positioning access points according to one embodiment of the present disclosure.

As shown in FIG. 7, positioning APs 114 installed in one building use directional antennae for delivering positioning WLAN signals toward particular areas. For example, common telecom APs 112 as compared with positioning APs 114 at building corners are installed in another building and use omnidirectional antennae which thus radiate telecom radio signals off their relevant building. In this case, users at the outside of the building will detect the inside telecom APs 112 and enter telecommunication, which inadvertently depletes the telecom resource.

On the other hand, positioning APs 114 with directional antennae installed at the building corners can radiate radio signals within the premises of the building preventing building outsiders from recognizing the interior positioning APs 114, which saves the telecom resources from being wasted resulting in increased accuracy of the WLAN-based positioning.

Figure 8:
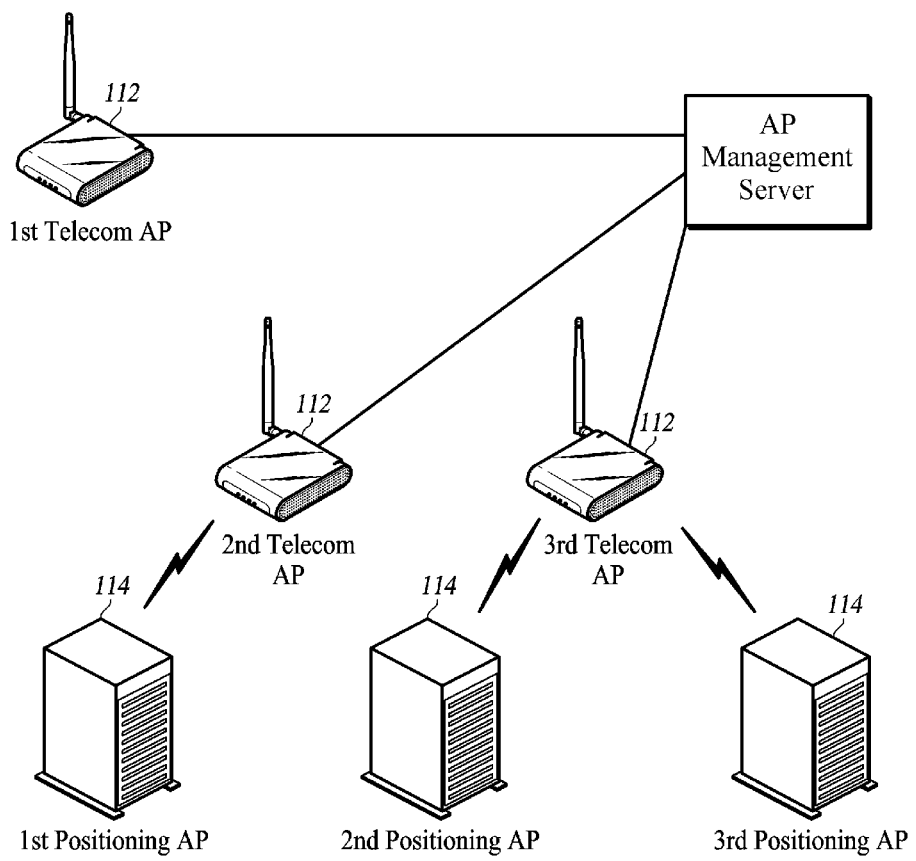
FIG. 8 is an exemplary diagram of a method for managing positioning access points according to one embodiment of the present disclosure.

FIG. 8 is an exemplary diagram of a method for managing positioning access points according to one embodiment of the present disclosure.

As illustrated, an AP management sever may perform managing positioning APs 114 to communicate with telecom APs 112. FIG. 8 depicts the AP management server communicating with telecom APs 112, although it is not restricted thereto, but the AP management server and WLAN-based positioning server 130 may interwork so that WLAN-based positioning server 130 also communicates with telecom APs 112 for managing positioning APs 114. In addition, the AP management server may be implemented within WLAN-based positioning server 130 which then communicates with telecom APs 112 for managing positioning APs 114.

With telecom APs 112 being capable of communicating with the AP management server, WLAN-based positioning server 130 can discern whether telecom APs 112 are malfunctioning. However, as for positioning APs 114 being incapable of communicating with the AP management server, they are difficult to manage. Therefore, the AP management server may periodically receive all information of access points including positioning APs 114 through their adjacent telecom APs 112, based on which the AP management server can determine whether signals are correctly radiated from positioning APs 114. In other words, a predetermined positioning WLAN signal supposed to be received from telecom APs 112 might be absent, when it is determined that those positioning APs for delivering the relevant signals are malfunctioning.

To give a more specific example, as illustrated in FIG. 8, it is set up by assumption that a positioning WLAN signal of a first positioning AP in the AP management server is received through a second telecom AP and a second and a third positioning APs through a third telecom AP. It will be understood that a separate database is necessary for managing the positioning WLAN signals of the positioning APs received through the telecom APs.

The telecom APs may help to search surrounding positioning WLAN signals periodically, transmit the detected positioning WLAN signal to the AP management server, and continue to monitor positioning APs 114. Herein, the positioning WLAN signals periodically transmitted to the AP management server includes at least one of MAC address of a positioning AP (BSSID), SSID, signal strength and AP channel information. In addition, when there are no certain times or more positioning WLAN signals received through a telecom AP, the AP management server determines that the relevant AP is not operating. In other words, the AP management server is responsive to no receipts by a certain times or more of the positioning WLAN signal of the first positioning AP through the second telecom AP for determining the inactivity of the first positioning AP.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Also, every one of the components may be implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. The computer readable media may include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful for application in the fields of positioning service provision wherein a WLAN network is constructed with separate positioning access points installed and stably uninfluenced by the traffic-dependent radio environmental changes and lines to achieve a high precision positioning within a service operator's setting of coverage premises.

CROSS-REFERENCE TO RELATED APPLICATION

If applicable, this application claims priority under 35 U.S.C §119(a) of Patent Application No. 10-2010-0064454, filed on Jul. 5, 2010 in Korea, the entire content of which is incorporated herein by reference. In addition, this non-provisional application claims priority in countries, other than the U.S., with the same reason based on the Korean Patent Application, the entire content of which is hereby incorporated by reference.

The invention claimed is:

1. A positioning apparatus, comprising:
a database configured to store identification information on each of a telecom access point and a positioning access point, and location information corresponding to the identification information,
wherein the telecom access point is configured to transfer a terminal WLAN signal between a server and a terminal, and
wherein the positioning access point is configured to transmit positioning information to the terminal and is distinguished from the telecom access point;
an information receiver configured to receive the terminal WLAN signal from the terminal in communication with at least one of the telecom access point and the positioning access point, in response to a positioning request from the terminal;
a record determination unit configured to determine whether access point identification information in a parameter of the received terminal WLAN signal is equal to the stored identification information on the positioning access point; and
a positioning determination unit configured to
assign priority to the access point identification information, based on the determination of the record determination unit, and
determine a location of the terminal by using location information corresponding to the access point identification information, based on the assigned priority,
wherein the telecom access point is configured to
search the terminal WLAN signal including the positioning information, which is transmitted from the positioning access point, and
transfer the searched terminal WLAN signal to an access point management server, and
wherein the access point management server is configured to monitor the positioning access point by using the transferred terminal WLAN signal.

2. The positioning apparatus of claim 1, wherein the positioning determination unit is configured to, when the access point identification information in the parameter of the received terminal WLAN signal is determined, by the record determination unit, to be equal to the identification information on the positioning access point,
assign a highest priority to the access point identification information, and
determine the location of the terminal by using location information corresponding to the access point identification information having the highest priority.

3. The positioning apparatus of claim 1, wherein
the record determination unit is configured to, when the access point identification information in the parameter of the received terminal WLAN signal is not determined, by the record determination unit, to be equal to the identification information on the positioning access point, determine whether the access point identification information in the parameter of the received terminal WLAN signal is equal to the identification information on the telecom access point.

4. The positioning apparatus of claim 1, wherein the positioning determination unit is configured to
receive a positioning WLAN signal of the positioning access point through the telecom access point along with a telecom WLAN signal in order to detect a malfunction or power off of the positioning access point, and
recognize the positioning access point at a relevant location to be malfunctioning or off unless the positioning WLAN signal is received.

5. The positioning apparatus of claim 4, wherein the positioning WLAN signal comprises at least one of MAC address information of the positioning access point, that comprises BSSID (Basic Service Set IDentifier) and SSID (Service Set IDentifier), access point channel information, a latitude data, a longitude data and an altitude data of the positioning access point.

6. The positioning apparatus of claim 5, wherein the positioning determination unit is configured to compare one or more information from the latitude data, longitude data and altitude data contained in the positioning WLAN signal with the stored location information corresponding to the positioning access point in the database to determine the location of the terminal.

7. The positioning apparatus of claim 1, wherein the record determination unit is configured to operate based on bits pre-assigned to a MAC address in the parameter of the terminal WLAN signal to determine manufacturer information of a relevant access point, and, when the manufacturer information corresponds to a pre-stored manufacturer information of the positioning access point, recognize the MAC address as a MAC address of the positioning access point.

8. The positioning apparatus of claim 1, wherein the database comprises:
a telecom access point database configured to store first identification information on the telecom access point and first location information which is location information of the telecom access point corresponding to the first identification information; and
a positioning access point database configured to store second identification information on the positioning access point and second location information which is location information of the positioning access point corresponding to the second identification information.

9. The positioning apparatus of claim 1, wherein the positioning access point is configured to transmit positioning information to the terminal by a beacon signal, without using an Ethernet connection.

10. The positioning apparatus of claim 1, wherein the positioning access point is a dummy access point which is not connected with a network.

11. The positioning apparatus of claim 1, wherein the positioning access point comprises a directional antenna configured to transmit outward or receive inward radio waves along a set direction.

12. The positioning apparatus of claim 1, wherein the positioning access point is configured to control a coverage of the positioning access point based on an external input.

13. The positioning apparatus of claim 1, wherein the positioning access point and the telecom access point are configured to communicate with the terminal by using the same frequency band.

14. A positioning method, comprising:
receiving a terminal WLAN signal from a terminal in communication with at least one of a telecom access point and a positioning access point, in response to a positioning request from the terminal,
wherein the telecom access point transfers a terminal WLAN signal between a server and a terminal, and
wherein the positioning access point transmits positioning information to the terminal and is distinguished from the telecom access point;
determining whether access point identification information in a parameter of a received terminal WLAN signal is equal to stored identification information on the positioning access point in a database;
assigning priority to the access point identification information, based on determined equality;
determining a location of the terminal, by using location information corresponding to the access point identification information, based on the assigned priority;
searching the terminal WLAN signal including the positioning information, which is transmitted from the positioning access point;
transferring the searched terminal WLAN signal to an access point management server, and
monitoring, by the access point management server, the positioning access point by using the transferred terminal WLAN signal.

15. The method of claim 14, wherein the positioning access point transmits positioning information to the terminal by a beacon signal, without using an Ethernet connection.

16. The method of claim 14, wherein the positioning access point is a dummy access point which is not connected with a network.

17. The method of claim 14, wherein the positioning access point comprises a directional antenna configured to transmit outward or receive inward radio waves along a set direction.

18. The method of claim 14, wherein the positioning access point and the telecom access point are configured to communicate with the terminal by the same frequency band.

* * * * *